United States Patent [19]
Wei

[11] Patent Number: 6,034,627
[45] Date of Patent: Mar. 7, 2000

[54] COMPUTER INPUT DEVICE

[76] Inventor: Meng-Yu Wei, 6F-5, No.31, Sun-Chiang Rd., Taipei, Taiwan

[21] Appl. No.: 09/063,547

[22] Filed: Apr. 20, 1998

[30] Foreign Application Priority Data

Feb. 19, 1998 [TW] Taiwan ................................. 87202387

[51] Int. Cl.[7] .................................................. H03K 17/94
[52] U.S. Cl. ............................ 341/20; 341/176; 345/163; 345/167
[58] Field of Search ..................... 341/20, 176; 345/163, 345/164, 167, 166

[56] References Cited

U.S. PATENT DOCUMENTS 4,913,573  4/1990  Retter ....................................... 345/163
5,841,425  11/1998  Zenz, Sr. ................................. 345/163

Primary Examiner—Michael Horabik
Assistant Examiner—Timothy Edwards, Jr.
Attorney, Agent, or Firm—W. Wayne Liauh

[57] ABSTRACT

A computer input device comprising: a housing, a tracking ball, at least a button and a through hole formed on the housing. The housing has a bottom surface, a top surface, a first side surface and a second side surface. The tracking ball is partially held within the housing while having part thereof exposed outside the housing through a bottom opening formed on the bottom surface. The hole is formed on a front portion of the top surface and has a size capable to accommodate a human's index finger such that the housing can be controlled and moved easily and readily by the finger accommodated in the hole. Since the housing can be moved and operated by using fingers merely without adapting to the size and shape of a human's palm, therefore the volume and size of the computer input device in accordance with the present invention can be reduced.

16 Claims, 4 Drawing Sheets

COMPUTER INPUT DEVICE

BACKGROUND OF THE INVENTION

1. Field of the Invention

This invention relates to a computer input device, such as a mouse or the like, which can be held and controlled by human fingers. The volume and the size of the mouse can be reduced greatly by altering the operation mode of the mouse.

2. Background of the Invention

As a result of the fast development of information technology, computer has become more and more popular in our daily life. Many software for computer have been designed for running under the Windows operating system. Users can execute commands by using a mouse to pick up or "click" the options or icons provided in the Windows system. For this reason, mouse has became a necessary peripheral equipment of personal computers.

Referring to FIG. 1, the mouse of the conventional type generally has a housing 1 which includes a upper cover 11 and a bottom cover 12. The front portion of the upper cover 11 is furnished with a left button 13 and a right button 14 for executing commands. Typically, there is a movable cursor shown on the monitor/screen of the computer for indicating a corresponding position of a tracking ball (not shown in FIG. 1) furnished on a bottom cover 12 under the housing 1 of the mouse. By moving the housing 1 above a flat surface to cause a relative sliding between the tracking ball and the flat surface, the tracking ball will rotate and the cursor shown on the monitor/screen will also move corresponding to the rotation of the tracking ball. When operating the mouse, a user need to use his/her palm together with his/her fingers to hold the housing 1, having his/her index and middle fingers placing at the front portion of the upper cover 11, and having his/her thumb and little fingers placing at opposite sides of the housing 1, while the palm of the user is adapted to fit the rear portion of the upper cover 11.

Short distances of horizontal motion of the cursor is controlled by moving user's wrist horizontally to move the housing 1 in a short distance. Sometimes user has to lift and drop the housing 1 and repeat above action for conducting a relatively long distance of horizontal motion. The small vertical motion of the cursor is achieved by making a vertical motion of the housing 1 controlled by user's elbow and arm. Sometime users has to lift and drop the housing 1 and repeat above action for conducting a relatively long distance of vertical motion. However, if user keeps operating and using the conventional mouse for a long time, it could possibly cause serious hurt to user's palm, wrist and arm on nerve and muscle. For instance, "Carpal tunnel syndrome", is one of the symptoms caused by moving or pressing the wrist all day long. In addition, because the shape of the conventional mouse is designed to adapt the user's palm, the volume and size of the mouse is generally fixed to a predetermined size and can not be reduced even though the size of its interior components is actually very small.

SUMMARY OF THE INVENTION

Therefore, the primary object of the invention is to prevent the above-described disadvantages caused by the conventional mouse. The mouse of the present invention does not need more than user's fingers to operate, such that the hurt of nerve and muscle can be minimized.

Another object of the invention is to disclose a computer input device which can be operated by using only user's fingers without the need of user's palm such that the volume and size of the computer input device can be greatly reduced.

BRIEF DESCRIPTION OF THE DRAWINGS

The foregoing features of the invention may be more fully understood from the following detailed description, read in conjunction with the accompanying drawings, wherein.

DESCRIPTION OF THE PREFERRED EMBODIMENT

Figure 1:
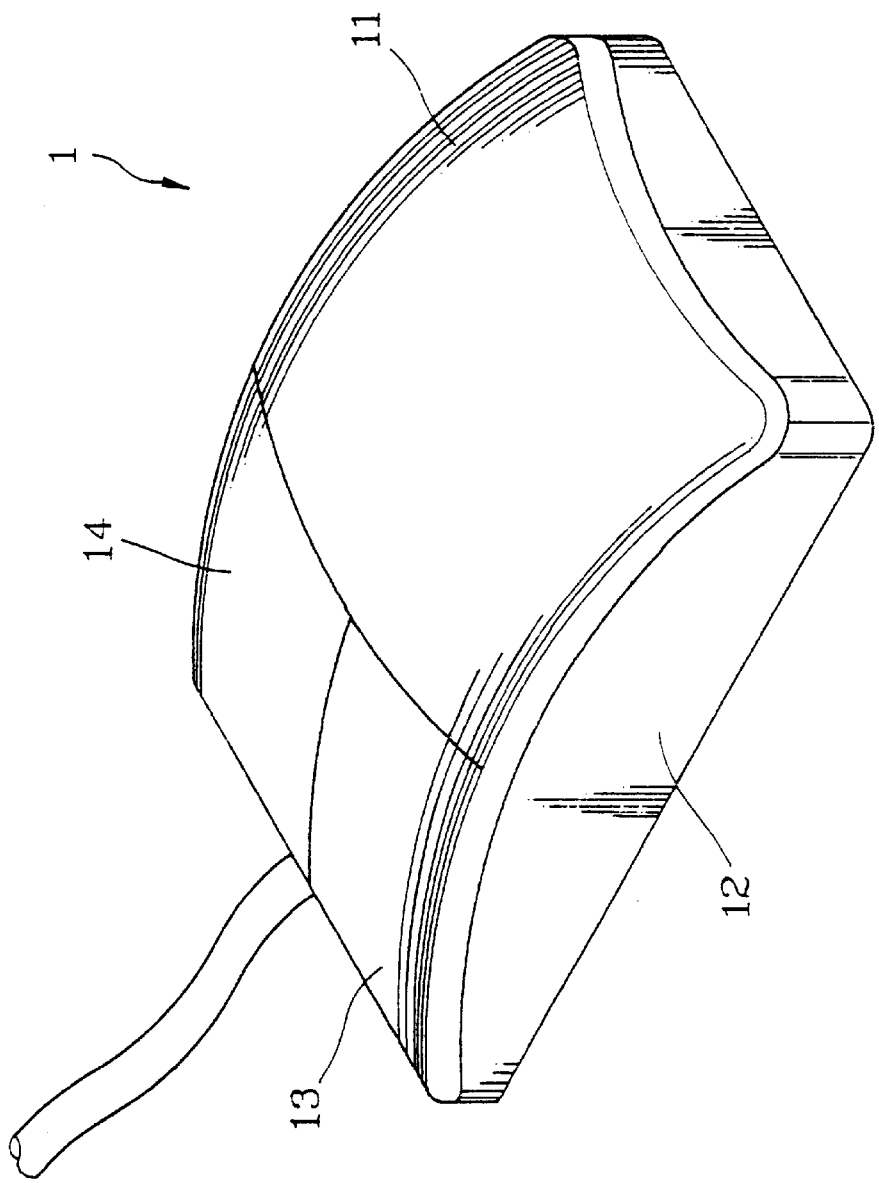
FIG. 1 is a perspective view of a conventional mouse.
Figure 2:
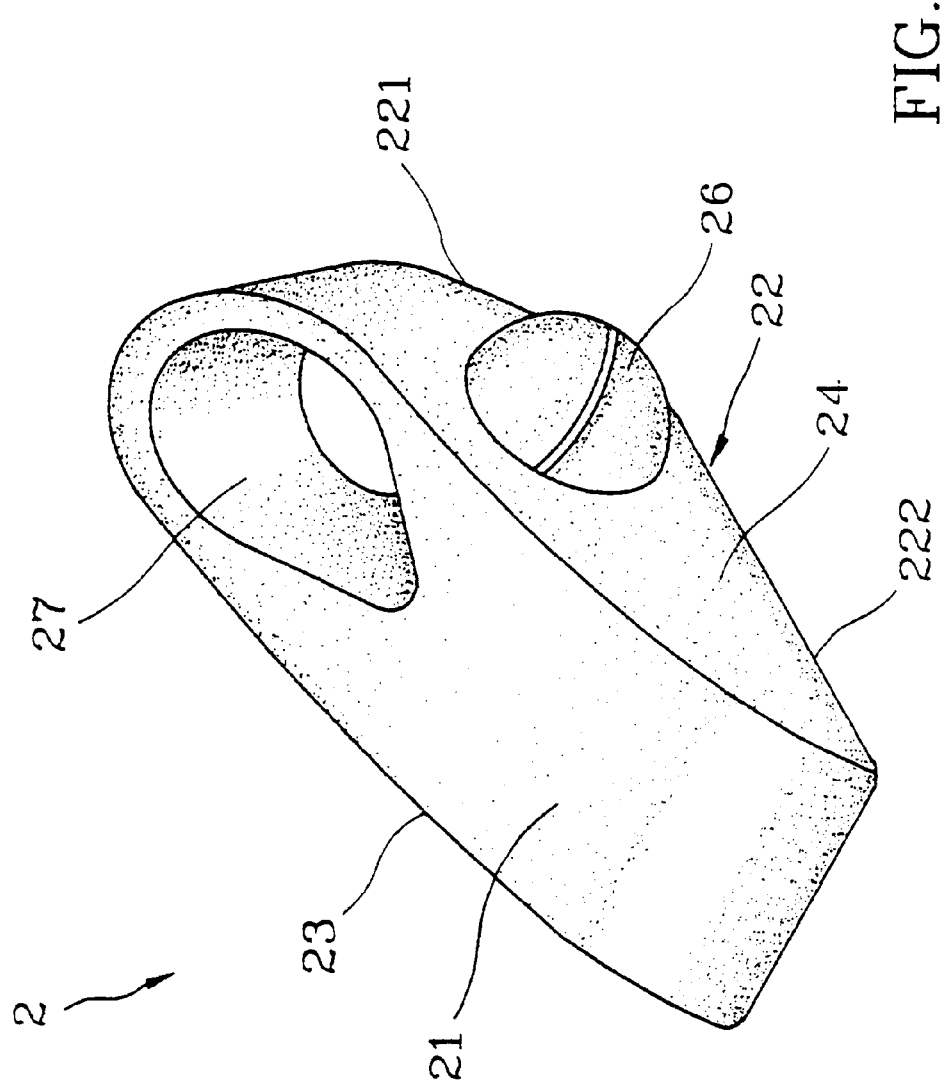
FIG. 2 is a perspective view of a preferred embodiment of the mouse in accordance with the present invention.
Figure 3:
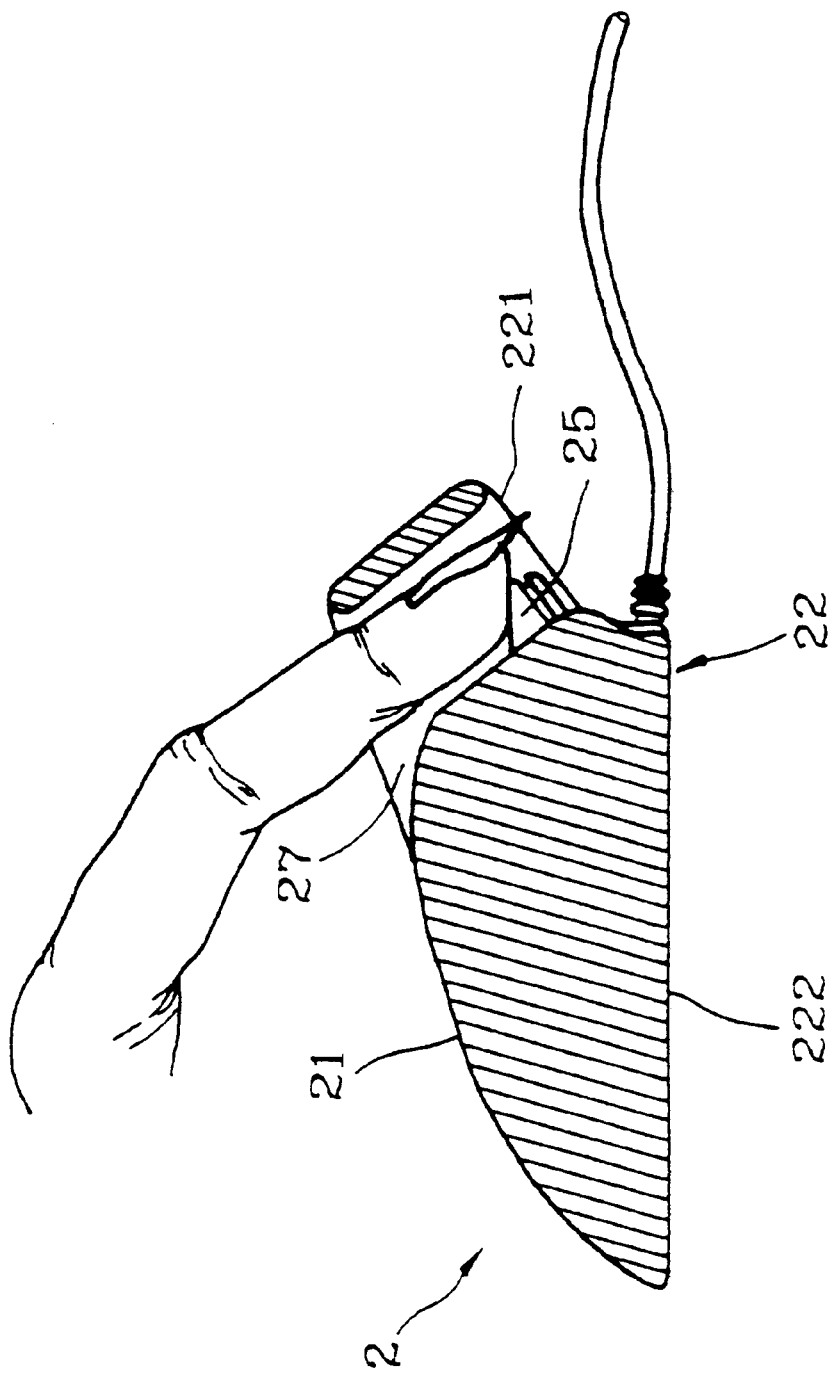
FIG. 3 is a side view of the mouse of the present invention.

Referring to FIG. 2, wherein a preferred embodiment of the computer input device in accordance with the present invention is shown. The computer input device is typically a mouse. As shown in FIG. 2, a preferred embodiment of the mouse comprises: a housing 2, a tracking ball (not shown in Figures), at least a button 26 and a through hole 27 formed on the housing 2. The housing 2 has a bottom surface 22, a top surface 21, a first side surface 23 and a second side surface 24. The tracking ball is partially held within the housing 2 while having part thereof exposed outside the housing 2 through a bottom opening (not shown in Figures) formed on the bottom surface 22. The hole 27 is formed on a front portion of the top surface 21 and has a size capable to accommodate at least the human's index finger such that the housing 2 can be controlled and moved easily and readily by the finger engaged within the hole 27. As shown in FIG. 3, A left button 25 is furnished on an inner surface of the hole 27 such that the index finger located in the hole 27 may click or push the left button 25 easily. The right button 26 is furnished on the second side surface 24. Furthermore, the bottom surface 22 includes a front slope surface 221 and a back bottom surface 222. It is noted that, the front and back bottom surfaces 221, 222 are preferably not lay in the same plane and are adjoining with each other by having the front slope surface 221 inclining an appropriate angle toward the front end of the upper surface 21. The tracking ball is typically located on the back bottom surface 222, while the hole 27 is located on the front slope surface 221.

Figure 4:
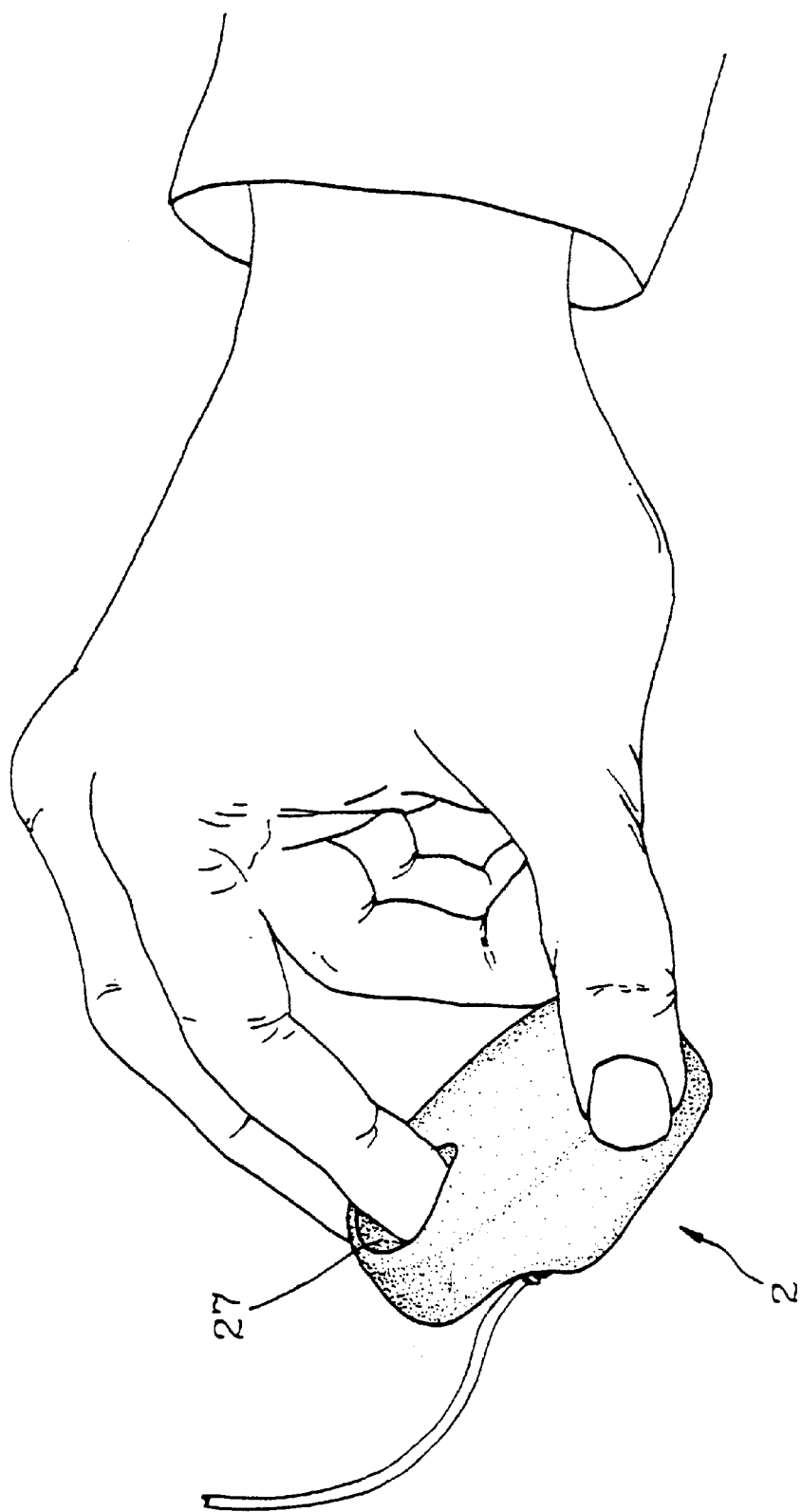
FIG. 4 illustrates an example for operating the mouse of the present invention.

Referring to FIG. 4, it illustrates a preferred operation mode of the present invention. Thumb, middle and ring fingers are placed on the first side surface 23 and second side surface 24 of the housing 2 to drive the mouse to move horizontally. The index finger is placed in the hole 27 and drives the mouse to move vertically. It only needs user's fingers to control, operate and move the mouse without having to use user's palm to hold the mouse. Even if a long distance motion of cursor is needed, it can be achieved by merely user's fingers. It is not necessary for user to rise his wrist and arm. For this reason, it causes almost no hurt to user's nerve and muscle for working all day. Since the size and shape of the mouse do not need to adapt to the size and shape of human's palm, therefore the size and volume of the mouse of the present invention can be greatly reduced in comparison with the conventional mouse of prior art.

The angle arrangement between front slop surface 221 and back bottom surface 222 of the bottom surface 22 is to avoid the contact between user's index finger and table when user drives the housing 2 to perform vertical motion. The hole 27 set on the front portion of the top surface 21 is a through hole, such that the user may press left button 25 easily even if his/her index finger or fingernail is longer then the depth of the hole 27.

The mouse of the present invention can be controlled by only user's fingers. It will not cause any damage to user's palm, wrist and arm. Furthermore, the housing 2 does not need to adapted to user's palm, so the volume can be shrunk to be only half size in comparison with a conventional mouse.

Although certain specific embodiment of the present invention has been shown and described above, it is to be understood that many modification thereof are possible. For instance, the tracking ball set on the bottom of bottom surface 22 can be replaced by an optical sensor. The invention can be designed to have one button only, or have two buttons, three buttons, or even more buttons. At least one of the buttons can be set on the first side surface 23, while the rest buttons are located either inside the hole 27 or on the second side surface 24. Another example for furnishing those buttons is to furnish one button within the hole 27, while having other buttons (one or more than one buttons) furnished on either the first side surface 23 or the second side surface 24 or both side surfaces 23, 24. A further example for furnishing those buttons is to furnish one button on the second side surface 24, while having the other buttons furnished on the first side surface 23 and the hole 27. In addition, the hole 27 may be designed to be in closed or opened forms.

I claim:

1. A computer input device comprising:

a housing having a bottom surface, a top surface, a first side surface and a second side surface, a tracking ball partially held within said housing, part of said tracking ball being exposed outside the housing through a bottom opening formed on said bottom surface, at least a button furnished on the housing, and a hole formed on a front portion of said top surface, said hole having a size capable to accommodate at least one human finger therein such that said housing is controlled and moved easily and readily by said finger accommodated in the hole, without the need of user's palm, such that the volume and size of the computer input device can be reduced, wherein said hole is a through hole from the top surface to the bottom surface of the housing.

2. The computer input device of claim 1, wherein the bottom surface of said housing includes a back bottom surface and a front slope surface adjoining said back bottom surface by inclining an appropriate angle leading toward a front end of the upper surface, said tracking ball being located on said back bottom surface.

3. The computer input device of claim 1, wherein said first side surface is furnished with at least one button.

4. The computer input device of claim 1, wherein said second side surface is furnished with at least one button.

5. The computer input device of claim 1, wherein said hole is furnished with at least one button therein.

6. The computer input device of claim 1, wherein said hole is a round hole which has a diameter larger than the width of a human's index finger.

7. The computer input device of claim 1, wherein said hole does not run through the top and bottom surfaces.

8. The computer input device of claim 1, wherein said hole is an opened hole.

9. A computer input device comprising:

a housing having a bottom surface, a top surface, a first side surface and a second side surface, an optical sensor furnished on said bottom surface, at least a button furnished on the housing, and a hole formed on a front portion of said top surface, said hole having a size capable to accommodate at least one human finger therein such that said housing is controlled and moved easily and readily by said finger accommodated in the hole, without the need of user's palm, such that the volume and size of the computer input device can be reduced, wherein said hole is a through hole from the top surface to the bottom surface of the housing.

10. The computer input device of claim 9, wherein the bottom surface of said housing includes a back bottom surface and a front slope surface adjoining said back bottom surface by inclining an appropriate angle leading toward a front end of the upper surface, said optical sensor being located on said back bottom surface.

11. The computer input device of claim 9, wherein said first side surface is furnished with at least one button.

12. The computer input device of claim 9, wherein said second side surface is furnished with at least one button.

13. The computer input device of claim 9, wherein said hole is furnished with at least one button therein.

14. The computer input device of claim 9, wherein said hole is a round hole which has a diameter larger than the width of a human's index finger.

15. The computer input device of claim 9, wherein said hole does not run through the top and bottom surfaces.

16. The computer input device of claim 9, wherein said hole is an opened hole.

* * * * *